Patented Jan. 26, 1932

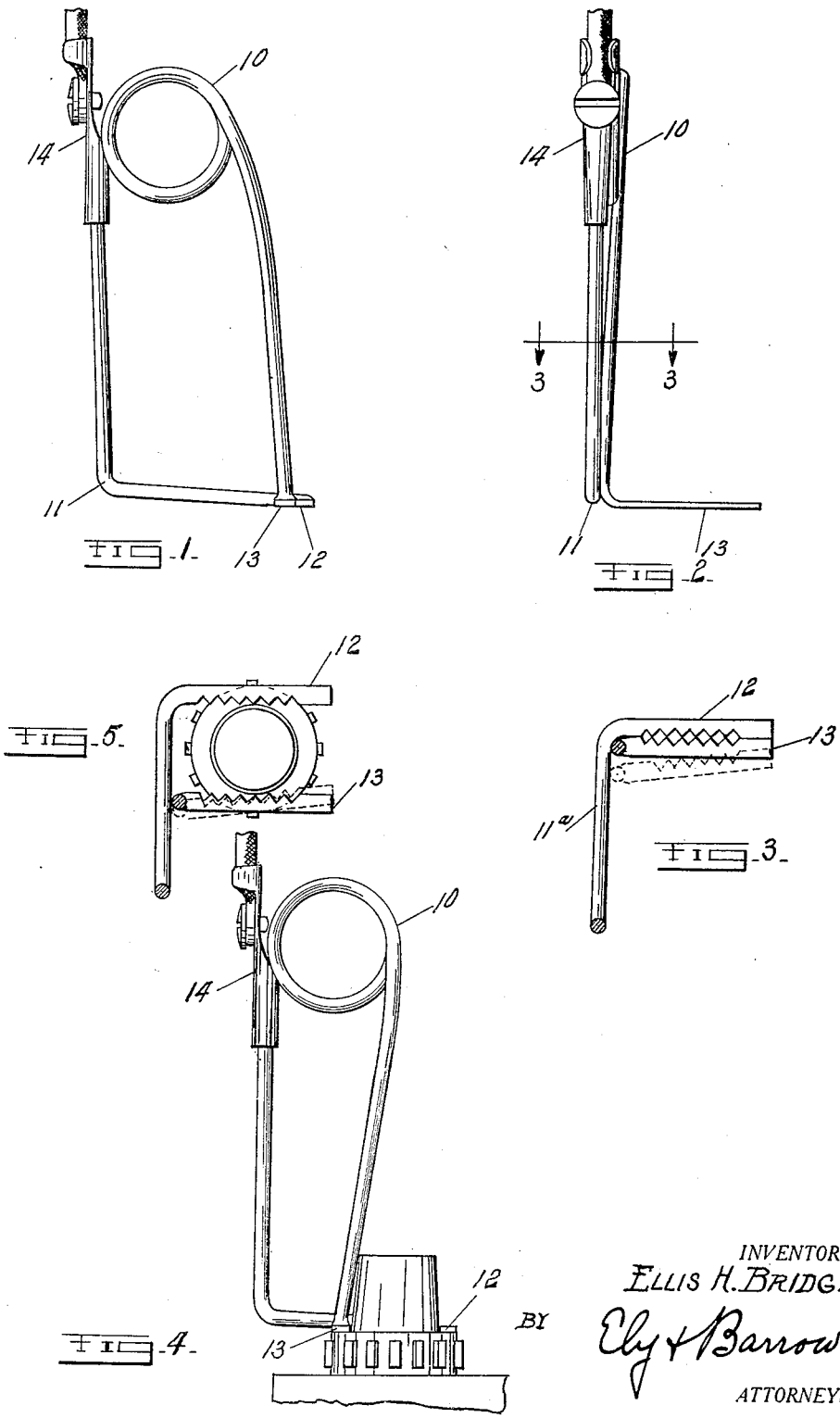

1,842,817

UNITED STATES PATENT OFFICE

ELLIS H. BRIDGE, OF CUYAHOGA FALLS, OHIO, ASSIGNOR, BY DIRECT AND MESNE ASSIGNMENTS, TO THE ELECTRIC STORAGE BATTERY COMPANY, OF PHILADELPHIA, PENNSYLVANIA, A CORPORATION OF NEW JERSEY

CLIP FOR ELECTRICAL CONNECTIONS

Application filed August 22, 1928. Serial No. 301,355.

This invention relates to clips for electrical connections and particularly clips for making connections to storage battery posts.

The general purpose of the invention is to provide an improved, more efficient clip which also is simpler and less expensive than clips heretofore used.

Particularly the invention has for its object the provision of a clip having cooperating jaws, one adapted to embrace a battery post or the like and the other movable against the battery post to clamp the clip thereon, the jaws being yieldingly urged together by a spring loop which is entirely to one side of the cooperating jaws and hence is operable without interference with the caps or plug for the usual battery cells and is not subject to corrosion by action of the acid spray during charging of a battery.

More particularly, the invention has for its object the provision of a battery clip such as described above constructed from a single piece of wire to which the usual binding post may be secured.

A further object of the invention is to provide in a battery clip, cooperating jaws which have relative angular movement as they engage on a battery post or the like, serving to embed the teeth in the post, cutting through any corrosion thereon and making an effective contact.

The foregoing and other objects are attained in the battery clip shown in the accompanying drawings and described below. It is to be understood that the invention is not limited to the particular form thereof shown and described.

Of the accompanying drawings:

Figure 1 is a side elevation of a clip embodying the invention;

Figure 2 is a rear elevation thereof;

Figure 3 is a section on line 3—3 of Figure 2;

Figure 4 is a side elevation of the clip shown mounted on a storage battery post; and Figure 5 is a section similar to Figure 3 with the clip shown in engagement with the post.

Referring to the drawings, the clip preferably comprises a single piece of wire looped at 10 and having one shank bent toward the other at 11 and both ends bent laterally in the same direction to one side of the loop and preferably formed so as normally to be slightly convergent to each other in the same plane, as indicated in Figure 3, to provide jaw portions 12 and 13. These jaw portions may be flattened and serrated as shown. The portion 11ª of one shank of the clip provides a guide for jaw 13, the shank of which rides against said portion. Jaw 12 limits movement of jaw 13 outwardly under the spring action of the loop. The clip has a binding post member 14 secured thereon at any suitable place.

As clearly appears in dotted lines in Figure 3, as the jaws are separated the jaw 13 assumes its normal or preformed position convergent to jaw 12, the spring action, when the jaws are urged together, setting up a torsion in the shank of jaw 13 which permits this jaw to move angularly relative to jaw 12 into engagement therewith across the width of the jaws.

When the compressed clip is engaged on a post and released thereon, the spring action of the loop causes jaw 13 to move angularly, in effect roll on the post, until it assumes substantially a parallel relationship with jaw 12. This is indicated by the initial dotted line position and the final full line position in Figure 5. This action tends to embed the teeth of jaw 13 into the lead post and cuts through any corrosion thereon to make an effective contact.

It will be apparent that a clip such as disclosed above will be very effective in use and is much easier and cheaper to manufacture. Its use, of course, is not limited to battery connections. Modifications of the invention may be resorted to without departing from the spirit thereof or the scope of the appended claim.

What is claimed is:

A terminal clip comprising a single piece of wire formed with an intermediate spring loop for normally urging the shanks apart, one shank extending toward and beyond the other and both ends of the wire being bent to one side of the clip to provide cooperating jaws extending laterally from the shanks, the jaw on one end of the wire engaging the jaw on the other end of the wire whereby the jaws are normally urged together, the loop being offset from the cooperating jaws, the jaw on the first-mentioned bent shank limiting movement of the jaw on the other shank by the spring action of the loop and the latter shank riding on the bent portion of the first-mentioned shank which provides a guide for the second-named jaw, the latter normally being formed so that the jaws are convergent toward their outer ends and adapted to shift angularly under the spring action of the loop when urged against a terminal post engaged by the first-named jaw.

ELLIS H. BRIDGE.